(12) United States Patent
Domingues et al.

(10) Patent No.: US 12,446,593 B2
(45) Date of Patent: Oct. 21, 2025

(54) CONFECTIONARY WITH IMPROVED OPACITY

(71) Applicant: General Mills, Inc., Minneapolis, MN (US)

(72) Inventors: David J. Domingues, Plymouth, MN (US); Ruiqi Li, Plymouth, MN (US); Vani Vemulapalli, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 18/289,095

(22) PCT Filed: May 5, 2022

(86) PCT No.: PCT/US2022/027831
§ 371 (c)(1),
(2) Date: Oct. 31, 2023

(87) PCT Pub. No.: WO2022/240648
PCT Pub. Date: Nov. 17, 2022

(65) Prior Publication Data
US 2024/0225035 A1    Jul. 11, 2024

Related U.S. Application Data

(60) Provisional application No. 63/188,739, filed on May 14, 2021.

(51) Int. Cl.
A23G 3/34 (2006.01)
A23G 3/40 (2006.01)
A23G 3/42 (2006.01)
A23L 5/41 (2016.01)

(52) U.S. Cl.
CPC ............. *A23G 3/343* (2013.01); *A23G 3/001* (2013.01); *A23G 3/40* (2013.01); *A23G 3/42* (2013.01); *A23L 5/41* (2016.08)

(58) Field of Classification Search
None
See application file for complete search history.

(56) References Cited

U.S. PATENT DOCUMENTS

| | | | | |
|---|---|---|---|---|
| 4,714,620 A | * | 12/1987 | Bunick | A23G 3/44 426/660 |
| 4,824,684 A | * | 4/1989 | Barry | A21D 13/38 426/660 |
| 5,011,701 A | * | 4/1991 | Baer | A23J 3/06 426/573 |
| 6,368,645 B2 | * | 4/2002 | Huang | A23G 3/343 426/243 |
| 2019/0320690 A1 | | 10/2019 | Vadlamani | |

OTHER PUBLICATIONS

Mesh chart (Year: 2024).*

* cited by examiner

*Primary Examiner* — Jyoti Chawla
(74) *Attorney, Agent, or Firm* — Jordan IP Law, LLC; Tina Yin Sowatzke, Esq.

(57) ABSTRACT

A confectionary that contains 3.0% to 3.5% of a short fiber length cellulose is described. The confectionary maintains a good opacity and texture after heating and good visual and textural stability over shelf life or at least one freeze/thaw cycle. A confectionary can typically have a relatively high moisture content, relatively low fat content, and relatively low non-fat solids content and retain the desired stability, opacity, and texture attributes. In some cases, a confectionary can exclude certain ingredients that consumers prefer to avoid.

14 Claims, 3 Drawing Sheets

CONFECTIONARY WITH IMPROVED OPACITY

CROSS-REFERENCE TO RELATED APPLICATIONS

Figure 1:
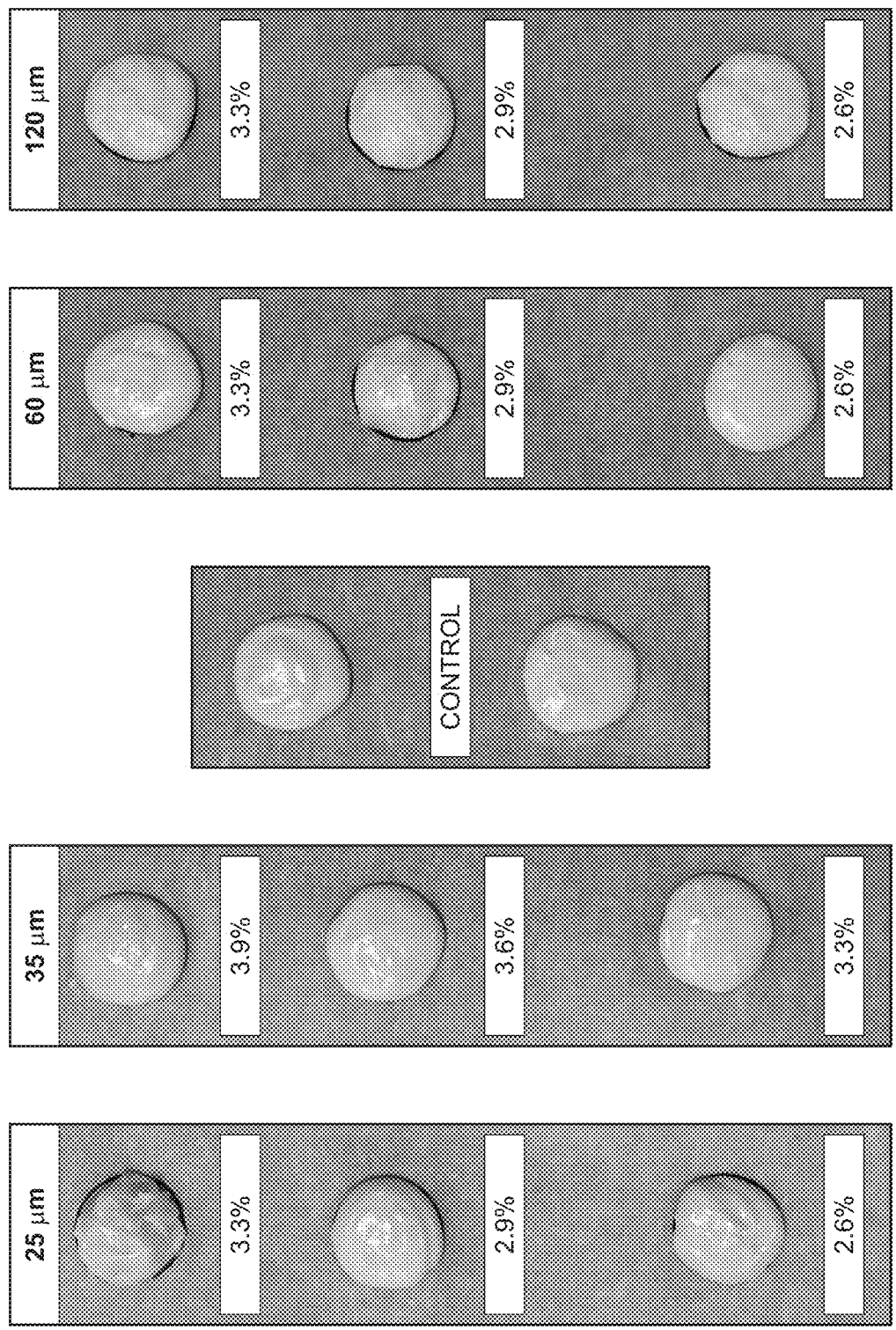

This application represents a National stage application of PCT/US2022/027831, filed May 5, 2022, entitled "Confectionary with Improved Opacity", pending, which claims priority to U.S. Patent Application Ser. No. 63/188,739, filed May 14, 2021. The entire content of these applications is incorporated by reference.

BACKGROUND

Consumers are increasingly looking for convenient foods that are enjoyable to eat. Heat-and-eat foods are a type of food that can be refrigerated or frozen, and then heated by the consumer before eating, or heated in a commercial setting, such as a restaurant or convenience store, and then sold to consumers as a ready-made hot food. Heat-and-eat foods can provide a quick hot snack or meal for consumers on the go or with limited time to make food from scratch.

SUMMARY

The present disclosure relates to confectionaries that retain good opacity after heating.

A confectionary is provided herein that include cellulose in an amount of 3.0% to 3.5% by weight of the confectionary, where the cellulose has an average fiber length of less than 35 µm, a fat content of about 10% to about 20% by weight of the confectionary, with at least 75% of the fat content being provided by a structuring fat having a melting point above room temperature, a water content of at least 30% by weight of the confectionary, a non-fat total solids content of 35% to 45% by weight of the confectionary, and essentially no titanium dioxide and essentially no calcium carbonate.

In some embodiments the amount of cellulose in a confectionary can be about 3.2% to about 3.4% by weight of the confectionary. In some embodiments the cellulose in a confectionary can have an average fiber length of about 20 µm to about 25 µm. In some embodiments, the cellulose in a confectionary can have a particle size where least 95% of the particles pass through a No. 400 US Mesh Size sieve.

In some embodiments, the non-fat solids content in a confectionary can include sweet whey solids in an amount of about 3% to about 4.5% by weight of the confectionary.

In some embodiments, a confectionary can have a sugar content of less than 40% by weight of the confectionary.

In some embodiments, a confectionary can have a viscosity of at least 40,000 cP as measured at 10 seconds using a size B T-bar spindle at 10 rpm and 70° F. In some embodiments, the viscosity can be from about 70,000 cP to about 100,000 cP.

In some embodiments, a confectionary can be a frosting, an icing, or a filling.

A method of making a confectionary is also provided herein. A method includes steps of combining non-fat liquid ingredients at sufficient shear to produce a homogeneous aqueous composition; combining the aqueous composition with a liquid fat with sufficient shear to produce a homogeneous fat suspension, the liquid fat comprising a structuring fat having a melting point above room temperature, and the fat suspension being at a temperature at or above the melting point of the structuring fat; combining the homogeneous fat suspension with dry ingredients with sufficient shear to produce the confectionary, the dry ingredients including cellulose having an average fiber length of less than 35 µm, and cooling the confectionary to a temperature at or below room temperature.

In some embodiments of a method provided herein, cellulose can be included in an amount of about 3.2% to about 3.4% by weight of the confectionary. In some embodiments, the cellulose can have an average fiber length of about 20 µm to about 25 µm.

In some embodiments of a method provided herein, the dry ingredients can include sweet whey solids in an amount of about 3% to about 4.5% by weight of the confectionary.

In some embodiments of a method provided herein, the confectionary can have a sugar content of less than 40% by weight of the confectionary.

In some embodiments of a method provided herein, the confectionary can have a viscosity of at least 40,000 cP as measured at 10 seconds using a T-bar spindle at 10 rpm and 70° F.

In some embodiments of a method provided herein, the fat suspension can be at a temperature of about 90° F. to about 120° F.

In some embodiments of a method provided herein, the aqueous composition includes starch or a syrup.

In some embodiments of a method provided herein, the confectionary can be a frosting, an icing, or a filling.

These and various other features and advantages will be apparent from a reading of the following detailed description.

DRAWINGS

Figure 2:
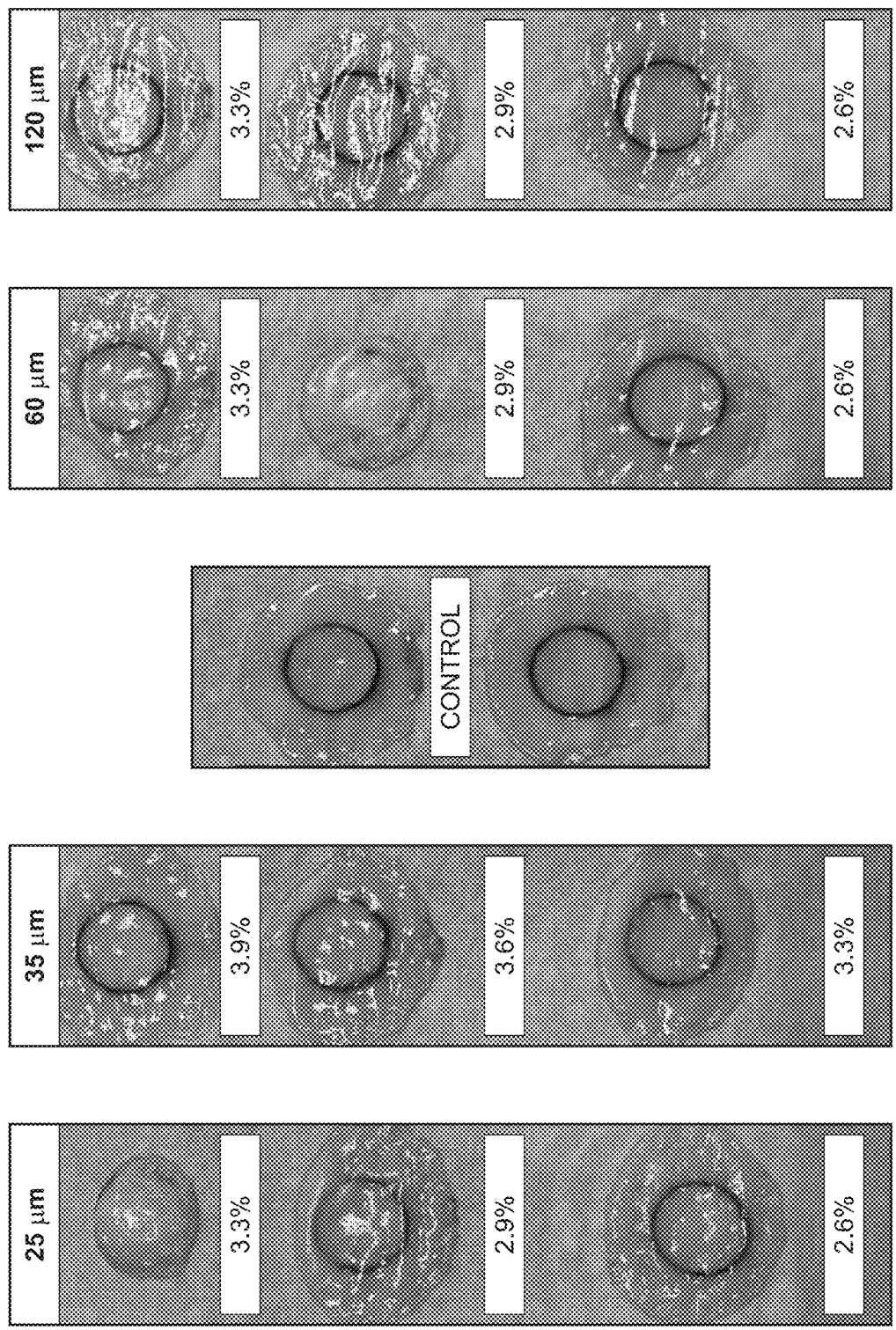
Figure 3:
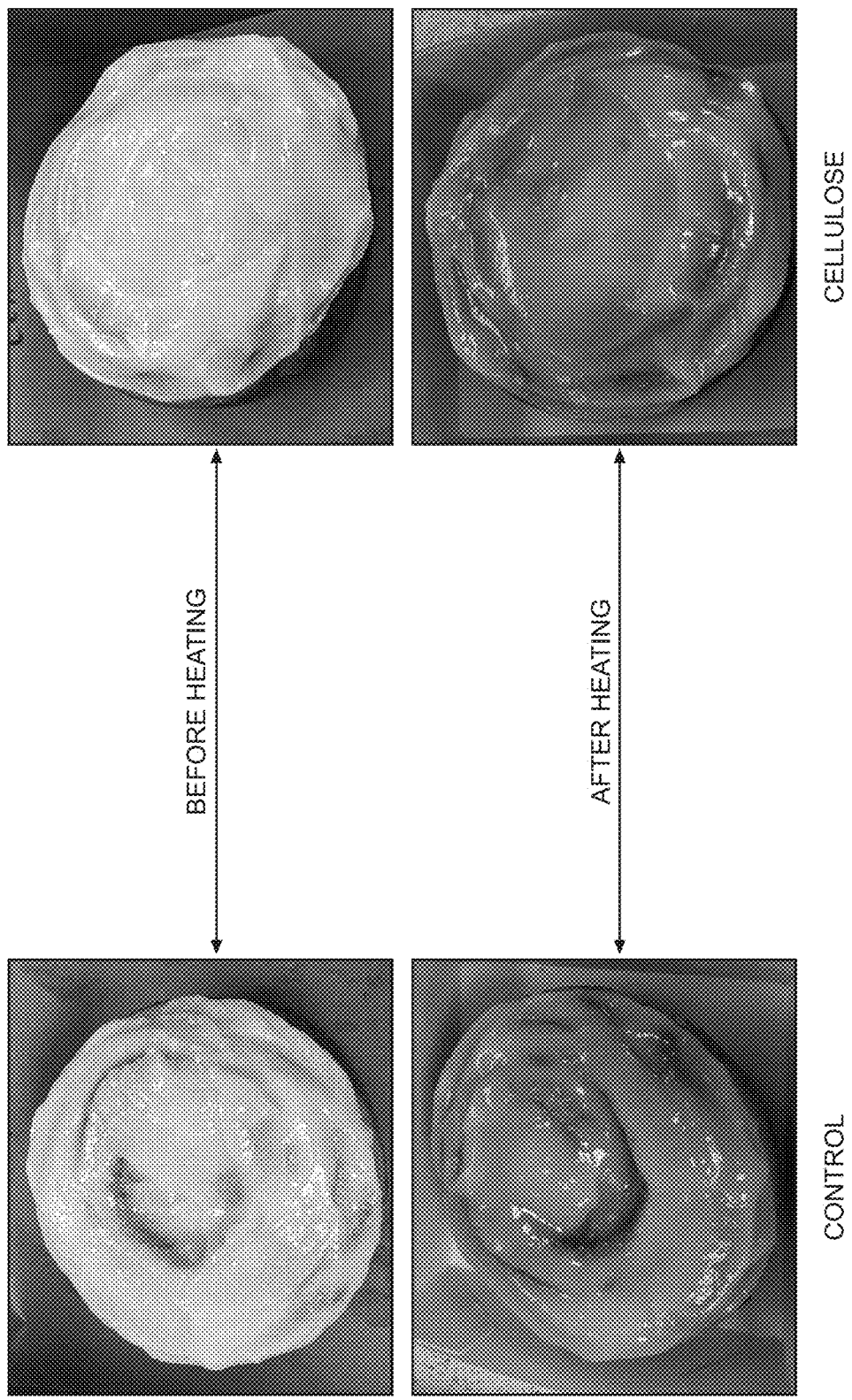

FIG. 1 shows samples from Table 1 before baking.
FIG. 2 shows samples from Table 1 after baking.
FIG. 3 shows samples from Example 2 before (upper) and after (lower) microwave heating.

DETAILED DESCRIPTION

Despite their convenience, consumers expect that convenient foods should still provide a delightful eating experience and visual appeal. This provides a challenge for heat-and-eat foods, which are typically fully or mostly assembled for convenience to the consumer, and then refrigerated or frozen. Refrigerated or frozen heat-and-eat foods are typically heated just before consumption, often with little or no time to allow for temperature adjustment (e.g., thawing) prior to heating. Thus, one challenge is to produce heat-and-eat foods with components that remain visually and texturally stable through at least one freeze/thaw cycle (e.g., without component separation or development of graininess). Another challenge is to produce heat-and-eat foods with components that remain visually and texturally stable through heating without requiring thawing or other temperature adjustment. A further challenge to formulating heat-and-eat foods with features that allow them to remain visually and texturally stable is that consumers are increasingly looking for foods that do not contain certain ingredients, such as whiteners (e.g., titanium dioxide, calcium carbonate, silicon dioxide, sodium silicate, calcium silicate, and bleaching agents, such as peroxides and other oxidizing agents), certain emulsifiers (e.g., mono- and di-glycerides, ethoxylated monoglyceride, succinylated monoglyceride, sodium stearoyl lactylate (SSL), calcium stearoyl lactylate, diacetyl tartaric acid ester of mono- and diglycerides (DATEM), and polysorbates), and certain other functional ingredients (e.g., glycerin, propylene glycol, alcohols (e.g., ethyl alcohol), sugar alcohols, and animal proteins, such as gelatin and collagen).

Consumers find many icings, frostings, and fillings more visually appealing if they are opaque. For example, cream cheese or cream cheese-flavored fillings, frostings, and icings are preferred to be opaque and white or off-white. While certain whitening agents, such as titanium dioxide and calcium carbonate, can improve opacity, many consumers prefer that those ingredients are not included in foods. Thus, the present inventors were challenged with making a confectionary that remained visually appealing and texturally appealing through an extended shelf life or at least one freeze/thaw cycle, and good through heating (e.g., baking or microwaving), and had attributes that allowed the confectionary to be manufactured using standard food manufacturing equipment, without the use of certain whiteners (e.g., titanium dioxide, calcium carbonate, silicon dioxide, sodium silicate, calcium silicate, and bleaching agents), certain emulsifiers (e.g., mono- and di-glycerides, ethoxylated monoglyceride, succinylated monoglyceride, SSL, calcium stearoyl lactylate, DATEM, and polysorbates), and certain other functional ingredients (e.g., glycerin, propylene glycol, ethyl alcohol, sugar alcohols, and animal proteins). In particular, a confectionary had to resist separation or graininess, retain high opacity, and have a smooth and/or creamy mouthfeel through an extended shelf life or at least one freeze/thaw cycle, and retain high opacity and good mouthfeel (e.g., smooth and/or creamy) through heating.

It was surprisingly discovered, and is disclosed herein, that including a cellulose that has a short fiber length in a confectionary provides good opacity to a confectionary, especially after heating, even in confectionaries with relatively low fat content, relatively high water content, relatively low non-fat solids content, and/or relatively low sugar content. A confectionary described herein can achieve good visual and textural stability over shelf life or through at least one freeze/thaw cycle, and can achieve good visual and textural stability during heating, even in a microwave. For example, in some embodiments, a confectionary provided herein can exhibit a low tendency to splatter during microwave heating.

Shelf life can be determined for a confectionary provided herein either alone (i.e., in a package with no other food components) or as a filling, icing, or frosting in and/or on another food component (e.g., a roll, a filled pastry, or the like). A confectionary provided herein has particular benefits over shelf life of a heat-and-eat type product. Shelf life can be measured at room temperature (typically about 70-75° F.), refrigerated temperature (typically about 37-42° F.), or frozen (32° F. or below). Shelf life of a confectionary provided herein can be at least 30 days (e.g., at least 60 days, or at least 90 days) at room temperature. In some embodiments, shelf life of a confectionary can be extended with a preservative (e.g., sodium benzoate, a tocopherols).

A confectionary provided herein includes a short fiber length cellulose in an amount of 3.0% to 3.5% by weight of the confectionary. An amount of 3.0% to 3.5% by weight short fiber length cellulose provides an increase in opacity to a confectionary, especially after heating. In addition, in some embodiments, an amount of 3.0% to 3.5% by weight short fiber length cellulose provides a desirable mouthfeel that is not gritty or pasty. In some embodiments, an amount of 3.0% to 3.5% by weight short fiber length cellulose can contribute to viscosity of a confectionary, such that the confectionary can be readily manufactured using conventional food manufacturing equipment while also reducing spread of the confectionary on a food surface during heating. It was discovered that an amount of short fiber length cellulose that exceeds 3.5%, the viscosity of the confectionary becomes too high and the texture becomes grainy and/or pasty. However, if the amount of short fiber length cellulose is less than 3.0%, the confectionary tends to lack sufficient opacity after heating and tends to spread too much over a surface during heating.

As used herein, the term "short fiber length cellulose" refers to a cellulose having an average fiber length of less than 30 μm. In some embodiments, a short fiber length cellulose has an average fiber length of about 20 μm to about 25 μm. In some embodiments, at least 95% of particles in a short fiber length cellulose pass through a No. 400 U.S. Mesh Size sieve (approximately 37 μm nominal sieve opening). It was discovered that cellulose having a fiber length of 35 μm or greater contributes poorly to opacity in a confectionary after heating, while generally contributing to a mouthfeel that is grainy and/or pasty. In many cases, confectionaries that included a cellulose having a fiber length of 35 μm or greater also had a tendency to spread too much over a surface during heating.

A confectionary provided herein generally has a relatively high water content (e.g., at least 30%, at least 35%, at least 40% by weight, or about 45% to about 55%). Water content can be provided by including water as an ingredient and/or by including ingredients that include at least some water content (e.g., sugar syrups, liquid fiber ingredients, liquid flavorants, liquid colorants, liquid pH adjusters, such as organic acids, and the like). Although high water content is typically associated with translucency and low viscosity, the inclusion of a short fiber length cellulose provides good viscosity and good opacity after heating, even with a water content of at least 30%. This is particularly surprising in a confectionary, as disclosed herein, containing relatively low solids content, since solids from fat and/or non-fat ingredients can be used to improve opacity, especially in the absence of certain whiteners, such as titanium dioxide and calcium carbonate.

A confectionary provided herein typically has a relatively low fat content. Although fat can contribute to opacity by adding solids to a confectionary, and can contribute a desirable mouthfeel in a confectionary, many consumers prefer limiting their fat consumption. The inclusion of a short fiber length cellulose provides a surprising benefit to opacity without having to include high levels of fat. In addition, the inclusion of a short fiber length cellulose can achieve a desired mouthfeel or texture. For example, a confectionary provided herein can be perceived as creamy, which is a texture often associated with high fat content. By maintaining a relatively low fat content, a confectionary described herein can provide an additional benefit of cost reduction, as fat ingredients can increase the cost of foods that include them.

In some embodiments, a confectionary provided herein includes a fat content of about 10% to about 20% (e.g., about 12% to about 18%, or about 14% to about 16%) by weight of the confectionary. In some embodiments, at least 75% (e.g., at least 80%, at least 90%, or at least 95%) of the fat content is provided by a structuring fat having a melting point above room temperature. For example, in some embodiments, a structuring fat can have a melting point of about 80° F. to about 100° F. (e.g., about 85° F. to about 95° F.). Appropriate structuring fats include, without limitation, coconut oil, palm oil, vegetable shortenings (e.g., palm oil shortening), lard, butter, and the like, or any combinations thereof, including blends with or without interesterification.

In some embodiments, up to 25% of the fat content is provided by an oil having a melting point at or below room temperature. Suitable oils include, without limitation, canola oil, soybean oil, peanut oil, and the like, or any combination thereof.

While fats with high melting points (e.g., above 120° F.) can be used to achieve a lower fat content while maintaining opacity and structure, they can contribute to a waxy mouthfeel. A confectionary provided herein can surprisingly achieve the desired opacity and structure even with relatively low amounts of a structuring fat that has a moderate melting point (e.g., 80° F. to 100° F.), while also maintaining a creamy mouthfeel and avoiding waxiness.

A confectionary provided herein typically has a relatively low non-fat solids content or less than 50% (e.g., about 35% to about 45%) by weight. While non-fat solids, such as carbohydrates (e.g., sugars, starches, non-cellulose fiber, and the like), proteins (e.g., milk proteins, plant proteins, and the like), minerals (e.g., titanium dioxide, calcium carbonate, and the like), can provide benefits to opacity, texture, and freeze/thaw stability, some consumers prefer to avoid certain ingredients, such as titanium dioxide. Although sugars can be used to provide structure, flavor, texture, and some opacity, many consumers wish to limit their consumption of sugars, and relying on sugar for structure and body can result in a confectionary that is too sweet. Further, some ingredients that can contribute to opacity, such as proteins, especially plant proteins (e.g., soybean protein or pea protein), can affect flavor immediately or over shelf life if they are included in high amounts.

The inclusion of a short fiber length cellulose provides a surprising benefit to opacity after heating and structure without having to include high levels of non-fat solids. In addition, a confectionary described herein is still surprising freeze/thaw stable despite having low overall non-fat solids content.

An additional benefit of the presently described confectionary is that a relatively low amount (e.g., less than 40%, or about 25% to about 30% by weight) of sugar (e.g., sucrose, fructose, or the like) can be used and still achieve a desired opacity, structure, body, and texture. The ability to use lower sugar content can allow a confectionary to be made with a flavor that can be adjusted in sweetness without disrupting structure. The ability to use lower sugar content can also allow other flavors in a confectionary to be perceived without being masked by sweetness.

A confectionary provided herein can contain a small amount (e.g., less than 6%, or about 4% to about 5%) of starch (e.g., native starch, modified starch, pregelatinized starch, or the like) to contribute to structure, body, and/or freeze/thaw stability. However, the amount of starch included in a confectionary is not sufficient without inclusion of the short fiber length cellulose to achieve the desired structure, body, and opacity.

Non-fat solids content of a confectionary provided herein can include, without limitation, one or more sugar (e.g., sucrose, fructose, or the like), one or more milk protein source (e.g., milk protein concentrate or isolate, whey protein concentrate or isolate, sweet whey solids, non-fat dry milk, cream cheese powder, or the like), one or more non-sugar carbohydrate (e.g., starch, non-cellulose fiber, and the like), one or more flavorant (e.g., salt, vanilla, and the like), one or more preservative (e.g., potassium sorbate, lactic acid, citric acid, and the like), one or more colorant (e.g., fruit or vegetable powders or juices, beta-carotene, and the like), and the like.

In some embodiments, a confectionary provided herein can include a protein that has emulsifying properties. Such a protein can be found in ingredients such as a milk ingredients (e.g., milk protein concentrate or isolate, whey protein concentrate or isolate, sweet whey solids, non-fat dry milk, cream cheese powder, or the like), egg ingredients (e.g., powdered whole egg, powdered egg yolk, and the like), or the like. An ingredient containing a protein with emulsifying properties can be included in a confectionary in an amount of from about 3% to about 5% (e.g., about 3% to about 4.5%, or about 3.5% to about 4.5%) by weight of the confectionary. An ingredient containing a protein with emulsifying properties can provide a benefit of contributing to stability of a confectionary that has relatively high water content while also containing fat, without requiring the inclusion of a non-protein emulsifier that some consumers prefer to avoid (e.g., mono- and di-glycerides, DATEM, polysorbates, and the like). In some embodiments, a milk ingredient, such as sweet whey solids, can provide both a benefit of providing a protein that has emulsifying properties and a flavor that complements a creamy texture achieved by a confectionary provided herein.

Preferably, a confectionary provided herein contains essentially no titanium dioxide and essentially no calcium carbonate. Preferably, a confectionary provided herein contains essentially no non-protein emulsifiers, such as locust bean gum, agar, mono- and di-glycerides, and the like. Preferably, a confectionary provided herein contains essentially no glycerin, propylene glycol, and gelatin. In some embodiments, a confectionary can contain essentially no whiteners (e.g., titanium dioxide, calcium carbonate, silicon dioxide, sodium silicate, calcium silicate, and bleaching agents, such as peroxides and other oxidizing agents), certain emulsifiers (e.g., mono- and di-glycerides, ethoxylated monoglyceride, succinylated monoglyceride, sodium stearoyl lactylate (SSL), calcium stearoyl lactylate, diacetyl tartaric acid ester of mono- and diglycerides (DATEM), and polysorbates), and certain other functional ingredients (e.g., glycerin, propylene glycol, alcohols (e.g., ethyl alcohol), sugar alcohols, and animal proteins, such as gelatin and collagen). As used herein, the term "essentially no" means that an ingredient is not intentionally added as an ingredient in a confectionary provided herein. It is to be understood that such an ingredient may be present in trace amounts incidental to contamination (e.g., in amounts less than 0.1%, less than 0.05%, or less than 0.01% by weight, or an undetectable amount), but that such trace amounts are not functional.

In some embodiments, a confectionary can have a viscosity of at least 40,000 cP (e.g., at least 70,000 cP, from about 70,000 cP to about 100,000, or from about 70,000 cP to about 90,000 cP). As used herein, viscosity is measured at 70° F. at 10 seconds using a Brookfield Viscometer Model DV-I Prime (Brookfield Engineering, Middleboro, MA, USA) fitted with a size B T-bar spindle at 10 rpm.

A confectionary provided herein can be made by combining ingredients with sufficient shear to achieve homogeneity. Suitable equipment for achieving sufficient shear include, without limitation a batch or continuous paddle mixer, in-line mixers (e.g., Boston shear pump), homogenizers, and the like. For example, in some embodiments, one or more mixing step can be performed using a mixer at a speed of at least 50 rpm (e.g., at least 55 rpm). In some embodiments, mixing can be for at least 30 seconds (e.g., about 1 minutes to about 7 minutes).

In some embodiments, a confectionary provided herein can be made by first combining non-fat liquid ingredients (e.g., water, sugar syrups, liquid fiber ingredients, liquid flavorants, liquid colorants, liquid pH adjusters, and the like) with sufficient shear to produce a homogeneous aqueous composition.

In some embodiments, starch can be included in a homogenous aqueous composition. In embodiments where starch is included in a homogenous aqueous composition, sufficient shear should be applied to achieve homogeneous dispersal of the starch.

In some embodiments, water can be added to a homogeneous aqueous solution. However, in some embodiments, water can be added at the same time as a liquid fat in a step of making a homogenous fat suspension as described below. Thus, in some embodiments, some or all of the water content of a homogeneous aqueous solution can be provided by other liquid ingredients, such as a syrup, or a flavor or acid solution.

In some embodiments, a homogeneous aqueous solution can be made using a mixer at a speed of at least 50 rpm (e.g., about 50 rpm to about 60 rpm) for about 1 minute to about 2 minutes at a temperature of about 65° F. to about 85° F. (e.g., about 70° F. to about 80° F.). In some embodiments, if a non-pregelatinized starch is included, a homogeneous aqueous solution can be heated at a temperature sufficient to gelatinize the starch.

A homogeneous aqueous composition can then be combined with a liquid fat (e.g., a melted structuring fat and/or a liquid oil) with sufficient shear to produce a homogeneous fat suspension. Although the term "suspension" is used, it is to be understood that homogeneous fat suspension can be a suspension or an emulsion. In some embodiments, a structuring fat, at a temperature at or above its melting point (e.g., about 100° F. to about 140° F., or about 120° F. to about 140° F.) can be added to a homogeneous aqueous solution at a temperature of about 75° to about 80° F. with sufficient shear to achieve a homogeneous fat suspension at a temperature greater than 80° F. (e.g., about 85° F. to about 95° F.).

In some embodiments, where a starch is included in a homogeneous aqueous solution, the starch can be gelatinized during formation of a homogeneous fat suspension if sufficient water is available for gelatinization of the starch. In some embodiments, a starch included in an aqueous solution can be pre-gelatinized.

In some embodiments, a homogeneous fat suspension can be made using a mixer at a speed of at least 50 rpm (e.g., about 50 rpm to about 60 rpm) for at least 1 minute (e.g., about 1 minute to about 2 minutes).

A homogeneous fat suspension can then be combined with short fiber length cellulose and any other dry ingredients (e.g., powdered ingredients supplying a protein with emulsifying properties, powdered dairy ingredients, granulated or powdered sugar or fiber ingredients, and the like) with sufficient shear to form a homogeneous confectionary.

In some embodiments, water (e.g., alone or as part of an aqueous minor ingredient, such as a flavor or an acid solution) can be added at the same time as short fiber length cellulose and any other dry ingredients.

In some embodiments, a homogeneous confectionary can be made using a mixer at a speed of at least 50 rpm (e.g., about 50 rpm to about 60 rpm) for at least 30 seconds (e.g., about 30 seconds to about 5 minutes).

A confectionary can be cooled (e.g., by allowing to cool to room temperature or by chilling using a refrigerator or freezer) to a temperature at or below room temperature. Cooling can be performed during or after combining a homogenous fat suspension with short fiber length cellulose and any other dry ingredients.

In some embodiments, a confectionary can be further homogenized using a homogenizer. For example, a confectionary can be homogenized at a pressure of at least 200 psi (e.g., at least 250 psi). In some embodiments, a confectionary can be homogenized in a single stage or using two or more stages. For example, a confectionary can be homogenized over two stages with one stage being at least 200 psi (e.g., about 250 psi) and another stage being at least 500 psi (e.g., about 750 psi). In some cases, a homogenization step can produce a smoother texture and a more stable structure over shelf life.

In some embodiments, a confectionary provided herein can be applied to a food as an icing, frosting, or filling immediately or shortly after production. In some embodiments a confectionary provided herein can be stored at or below room temperature (e.g., refrigerated or frozen) prior to being used as an icing, frosting, or filling. A confectionary can be stored in bulk to be used in manufacturing foods that include the confectionary (e.g., heat-and-eat foods), or in smaller packages to be used by a consumer to apply to a food themselves.

In some embodiments, a confectionary provided herein that is applied as a frosting, icing, or filling to a food by a manufacturer can be refrigerated or frozen as part of the food (e.g., a heat-and-eat food) for later preparation (e.g., thawing, microwaving, or baking) before consumption. A confectionary provided herein as part of a heat-and-eat food can display good textural and visual stability through at least one freeze/thaw cycle (if the food is frozen) and during heating before consumption, and have good opacity following heating before consumption.

In some embodiments, a confectionary provided herein can resemble a cream cheese-based frosting, filling, or icing in flavor and/or texture while having better stability during a freeze/thaw cycle and/or during heating than a traditional cream cheese-based frosting, filling, or icing.

The following examples are provided to illustrate embodiments of the invention.

EXAMPLES

Example 1

Samples were made with or without various cellulose contents (see Table 1) by combining cellulose (if included) with palm oil shortening, water, corn syrup, modified starch, sweet whey solids, salt, flavor, lactic acid, potassium sorbate, and natural flavors to achieve a water content of about 50-52%, a fat content of about 12-17%, a pregelatinized starch content of about 4-5%, a sugar content of 20-22%, and an overall non-fat solids content (including cellulose) of about 32-35%. The samples were made by combining the corn syrup and starch in a Hobart N50 bench top mixer (Hobart Corporation, Troy, Ohio, USA) fit with a paddle beater set at low speed until the starch was well-dispersed (about 1 minute) to make a homogenous aqueous composition. The shortening was added as a liquid at a temperature of about 140° F. along with water at 140° F. and combined with the homogenous aqueous composition in the Hobart N50 bench top mixer set at low speed until the fat was well-dispersed (about 2 minutes) to make a homogenous fat suspension. The dry ingredients, including cellulose and sweet whey solids, and other minor ingredients that were pre-blended using a hand blender (minors mixed for about 40 seconds applied at 8 second pulses) were then added to the homogenous fat suspension and blended using a hand blender until homogeneous to make the confectionary samples.

TABLE 1

Cellulose Content (by weight of confectionary)
Average fiber length

| Sample | 25 μm | 35 μm | 60 μm | 120 μm |
|---|---|---|---|---|
| Control | — | — | — | — |
| 25-2.6 | 2.6% | — | — | — |
| 25-2.9 | 2.9% | — | — | — |
| 25-3.3 | 3.3% | — | — | — |
| 25-3.6 | 3.6% | — | — | — |
| 35-3.3 | — | 3.3% | — | — |
| 35-3.6 | — | 3.6% | — | — |
| 35-3.9 | — | 3.9% | — | — |
| 60-2.6 | — | — | 2.6% | — |
| 60-2.9 | — | — | 2.9% | — |
| 60-3.3 | — | — | 3.3% | — |
| 120-2.6 | — | — | — | 2.6% |
| 120-2.9 | — | — | — | 2.9% |
| 120-3.3 | — | — | — | 3.3% |

Each of the samples in Table 1 was tested for viscosity and tasted to determine mouthfeel. Then, each sample was placed on a piece of parchment paper on a baking sheet and baked at 320° F. for 3 minutes. Following baking, each sample was observed to determine appearance, including opacity or translucency, color, surface appearance, and spread. Table 2 describes the appearance, mouthfeel, and viscosity of each of the samples from Table 1.

TABLE 2

| Sample | Appearance after baking | Mouthfeel | Viscosity (cP) |
|---|---|---|---|
| Control | Low opacity/translucent<br>Off-white<br>Shiny, smooth surface<br>High spread | Smooth<br>Creamy | 33400 |
| 25-2.6 | Low opacity/translucent<br>Off-white<br>Shiny, smooth surface<br>High spread | Smooth<br>Creamy | 32200 |
| 25-2.9 | Low to moderate opacity/moderately translucent<br>Off-white<br>Shiny, smooth surface<br>High spread | Smooth<br>Creamy | 34600 |
| 25-3.3 | High opacity<br>Off-white<br>Shiny, smooth surface<br>Low spread | Smooth<br>Creamy | 84800 |
| 25-3.6 | NA* | Grainy<br>Pasty | ND** |
| 35-3.3 | Low opacity/translucent<br>Off-white<br>Shiny, smooth surface<br>High spread | Smooth<br>Creamy | 24400 |
| 35-3.6 | Low opacity/translucent<br>Off-white<br>Less shiny, slightly coarse surface<br>High spread | Grainy<br>Pasty | 28200 |
| 35-3.9 | Low opacity/translucent<br>Off-white<br>Coarse, dull surface<br>High spread | Grainy<br>Pasty | 36200 |
| 60-2.6 | Low opacity/translucent<br>Off-white<br>Less shiny, slightly coarse surface<br>High spread | Smooth<br>Creamy | 29800 |
| 60-2.9 | High opacity<br>Off-white | Grainy<br>Pasty | 32800 |
| 60-3.3 | Coarse, dull surface<br>Low spread<br>Low opacity/translucent<br>Off-white<br>Shiny, smooth surface<br>High spread | Grainy<br>Pasty | 47800 |
| 120-2.6 | Low opacity/translucent<br>Off-white<br>Coarse, dull surface<br>High spread | Grainy<br>Pasty | 37000 |
| 120-2.9 | Low opacity/translucent<br>Off-white<br>Coarse, dull surface<br>High spread | Grainy<br>Pasty | 42000 |
| 120-3.3 | Low opacity/translucent<br>Off-white<br>Coarse, dull surface<br>High spread | Grainy<br>Pasty | 61200 |

*NA—sample not tested;
ND—sample viscosity was too high to measure by this method As can be seen from Table 2 (and is illustrated in FIG. 1 and FIG. 2**), sample 25-3.3 achieved both good opacity after baking with little spread and a smooth, creamy texture. Samples containing 2.9% or 3.3% of the 25 μm cellulose retained a good texture, but lacked opacity after baking and spread significantly. With the exception of sample 60-2.9, all of the other samples failed to remain sufficiently opaque after baking and generally spread significantly, and many of them had a poor mouthfeel. Sample 60-2.9 had good opacity and spread after baking, but had poor mouthfeel. Interestingly, viscosity of the confectionaries prior to heating did not necessarily correlate to spread during baking. Compare samples 60-2.9 and 60-3.3.

Example 2

Samples from Table 1, including Control (no cellulose) and 25-3.3 (3.3% of 25 μm cellulose) were applied as a thick frosting layer to the surface of cinnamon rolls. Each frosted cinnamon roll was placed in a paperboard box and frozen for 3-6 months. Following freezing, the cinnamon rolls were thawed in their paperboard box for up to 48 hours at ambient conditions, then microwaved in their paperboard box for 14 seconds at 100% power level. The two cinnamon rolls reached a similar temperature (134-138° F.). Both frostings remained mostly on the surface of the heated rolls and appeared shiny. However, the control frosting appeared to migrate from the raised areas of the roll into the creases of the roll, and appeared to be translucent compared to the frosting with cellulose, which did not appear to migrate from the raised areas of the roll. See, FIG. 3. Similar to control, the frosting with cellulose did not appear to splatter during microwave heating.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A confectionary, comprising:
   a. cellulose in an amount of 3.0% to 3.5% by weight of the confectionary, the cellulose having an average fiber length of 20 μm to 25 μm;

b. a fat content of 10% to 20% by weight of the confectionary, with at least 75% of the fat content being provided by a structuring fat having a melting point above room temperature;

c. a water content of 45% to 55% by weight of the confectionary;

d. a non-fat total solids content of 35% to 45% by weight of the confectionary; and e. 0% to less than 0.01% by weight of the confectionary titanium dioxide and 0% to less than 0.01% by weight of the confectionary calcium carbonate, wherein the confectionary is a frosting, an icing, or a filling.

2. The confectionary of claim 1, wherein the amount of cellulose is 3.2% to 3.4% by weight of the confectionary.

3. The confectionary of claim 1, wherein the cellulose has a particle size where least 95% of the particles pass through a No. 400 US Mesh Size sieve.

4. The confectionary of claim 1, wherein the non-fat solids content comprises sweet whey solids in an amount of 3% to 4.5% by weight of the confectionary.

5. The confectionary of claim 1, wherein the confectionary has a sugar content of less than 40% by weight of the confectionary.

6. The confectionary of claim 1, wherein the confectionary has a viscosity of at least 40,000 cP as measured at 10 seconds using a size B T-bar spindle at 10 rpm and 70° F.

7. The confectionary of claim 6, wherein the viscosity is from 70,000 cP to 100,000 cP.

8. A method of making a confectionary, the method comprising:
   a. combining non-fat liquid ingredients at sufficient shear to produce a homogeneous aqueous composition;
   b. combining the aqueous composition with a liquid fat with sufficient shear to produce a homogeneous fat suspension, the liquid fat comprising a structuring fat having a melting point above room temperature, and the fat suspension being at a temperature at or above the melting point of the structuring fat;
   c. combining the homogeneous fat suspension with dry ingredients with sufficient shear to produce the confectionary, the dry ingredients including cellulose having an average fiber length of 20 μm to 25 μm, the confectionary being homogeneous including:
      i. the cellulose in an amount of 3.0% to 3.5% by weight of the confectionary;
      ii. a fat content of 10% to 20% by weight of the confectionary, with at least 75% of the fat content being provided by the structuring fat;
      iii. a water content of 45% to 55% by weight of the confectionary;
      iv. a non-fat total solids content of 35% to 45% by weight of the confectionary; and
      v. 0% to less than 0.01% by weight of the confectionary titanium dioxide; and
   d. cooling the confectionary to a temperature at or below room temperature, wherein the confectionary is a frosting, an icing, or a filling.

9. The method of claim 8, wherein the amount of cellulose is 3.2% to 3.4% by weight of the confectionary.

10. The method of claim 8, wherein the dry ingredients include sweet whey solids in an amount of 3% to 4.5% by weight of the confectionary.

11. The method of claim 8, wherein the confectionary has a sugar content of less than 40% by weight of the confectionary.

12. The method of claim 8, wherein the confectionary has a viscosity of at least 40,000 cP as measured at 10 seconds using a T-bar spindle at 10 rpm and 70° F.

13. The method of claim 8, wherein the fat suspension is at a temperature of 90° F. to 120° F.

14. The method of claim 8, wherein the aqueous composition comprises starch or a syrup.

* * * * *